(12) United States Patent
Galimberti et al.

(10) Patent No.: US 6,403,737 B1
(45) Date of Patent: Jun. 11, 2002

(54) ELASTOMERIC COPOLYMERS OF ETHYLENE WITH α-OLEFINS AND PROCESS FOR THEIR PREPARATION

(75) Inventors: Maurizio Galimberti, Milan; Luigi Resconi, Ferrara; Enrico Albizzati, Arona, all of (IT)

(73) Assignee: Basell Technology Company BV, Hoofddorp (NL)

( * ) Notice: Subject to any disclaimer, the term of this patent is extended or adjusted under 35 U.S.C. 154(b) by 46 days.

(21) Appl. No.: 09/694,160

(22) Filed: Oct. 24, 2000

Related U.S. Application Data

(62) Division of application No. 08/876,864, filed on Jun. 16, 1997, now Pat. No. 6,160,071, which is a continuation of application No. 08/471,345, filed on Jun. 6, 1995, now abandoned, which is a continuation of application No. 08/239,769, filed on May 9, 1994, now abandoned.

(30) Foreign Application Priority Data

May 11, 1993 (IT) .......................................... MI93A0943

(51) Int. Cl.$^7$ ................................................. C08F 4/42
(52) U.S. Cl. .................... 526/160; 526/348; 526/348.6; 526/335; 526/336; 526/943; 526/153
(58) Field of Search .............................. 526/348, 348.6, 526/335, 336, 160, 943, 153

(56) References Cited

U.S. PATENT DOCUMENTS

| | | | |
|---|---|---|---|
| 5,001,205 A | 3/1991 | Hoel | 526/128 |
| 5,252,529 A | 10/1993 | Ueda et al. | 502/113 |
| 5,292,845 A | 3/1994 | Kawasaki et al. | 526/336 |
| 5,436,305 A | * 7/1995 | Alt et al. | 526/160 |

FOREIGN PATENT DOCUMENTS

| | | |
|---|---|---|
| EP | 0 129 414 | 12/1984 |
| EP | 0 524 624 | 1/1993 |

OTHER PUBLICATIONS

Soga, K., et al., "Effect of Catalyst Isospecificity on Olefin Copolymerization," *Makromolekulare Chemie*, 191 (1990) Dec., No. 12, pp. 2853–2864.
European Search report, datred Aug. 30, 1994 of EP 94 10 6976 (corresponding application).

* cited by examiner

Primary Examiner—David W. Wu
Assistant Examiner—Ling-Siu Choi
(74) Attorney, Agent, or Firm—Bryan Cave, LLP

(57) ABSTRACT

A process for the preparation of amorphous copolymers of ethylene with α-olefins and optionally minor amounts of polyenes are disclosed, which have the following characteristics:

(A) the % by mole content of α-olefin in the copolymer (%α) and the ratio between the molar amount of α-olefin diads and the molar content of α-olefin in the copolymer (αα/α) satisfy the following relationship:

$$(\%\alpha) - 250 \, (\alpha\alpha/\alpha) \geq 10$$

(B) less than 2% of the $CH_2$ groups in the polymeric chain are in sequences $(CH_2)_n$, wherein n is an even number.
These copolymers are obtained by operating in the presence of particular metallocene-based catalysts having two fluorenyl groups joined together through a bridging group.

2 Claims, 2 Drawing Sheets

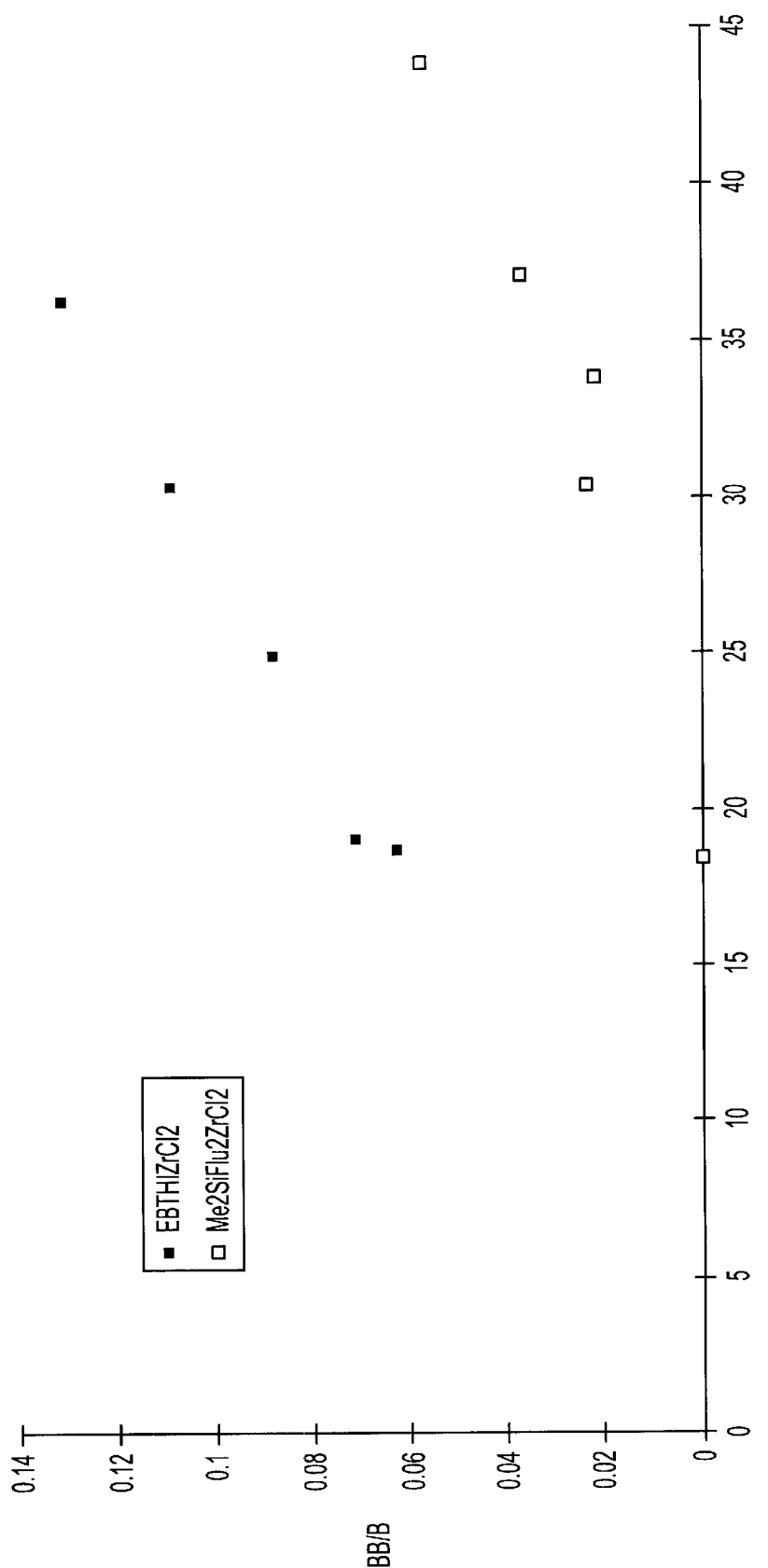

ELASTOMERIC COPOLYMERS OF ETHYLENE WITH α-OLEFINS AND PROCESS FOR THEIR PREPARATION

This Application is a divisional of U.S. Ser. No. 08/876,864, filed on Jun. 16, 1997, now U.S. Pat. No. 6,160,071, which is a continuation of U.S. Ser. No. 08/471,345, filed on Jun. 6, 1995, now abandoned, which is a continuation of U.S. Ser. No. 08/239,769, filed on May 9, 1994, now abandoned.

The present invention relates to copolymers of ethylene with α-olefins and to the process for their preparation. More particularly, the present invention relates to substantially amorphous copolymers of ethylene with one or more α-olefins containing 4 or more carbon atoms, and optionally with a minor amount of polyenes.

BACKGROUND OF THE INVENTION

Copolymers of ethylene with one or more α-olefins and optionally a minor amount of polyenes are known which, after vulcanization, exhibit elastomeric type properties. The most common of these are copolymers of ethylene with propylene (EPR), which can contain small amounts of non-conjugated diene monomers (EPDM).

Thanks to their good resistance to high temperatures, chemical and atmospheric agents, and their dielectric properties, these elastomers find uses in various application fields. Principally they can be used as additives for lubricating oils, covering materials in building, electric insulators, components in the automotive industry or modifiers in mixtures with thermoplastic polymers.

Elastomeric copolymers of ethylene with α-olefins different from propylene, at the date of the present invention, do not have interesting industrial application.

The above mentioned ethylene copolymers are generally prepared in the presence of Ziegler-Natta catalysts.

Natta et al, for example, in "La Chimica e l'Industria, 41, 769 (1959)", describe copolymerization reactions of ethylene with 1-butene in the presence of vanadium halides and trialkyl aluminium compounds.

The copolymers so obtained have a high tendency to produce blocks of α-olefin comonomers in the chain, and this gives rise to crystallinity negatively influencing the final characteristic of the product. Therefore, in order to obtain vulcanized copolymers which are endowed with good elastomeric properties, it is important that the distribution of the monomeric units within the chain is as homogenous as possible.

Zambelli et al., in "Makromol. Chem., 115, 73 (1968)" describe the preparation of copolymers of ethylene and 1-butene in the presence of a catalytic system comprising $VCl_4$, $AlEt_2Cl$ and anisole. The copolymers obtained have a tendency to an alternating distribution of the comonomer.

More recently, ethylene copolymers of this type have been prepared in the presence of homogeneous catalysts obtained from metallocenes and aluminoxane compounds.

U.S. Pat. No. 5,001,205, for example, describes a process for the preparation of elastomeric copolymers of ethylene with α-olefins, in which the product obtained from the reaction of methylaluminoxans (MAO) with a bis-cyclopentadiene compound of Zr, Ti, or Hf, such as bis(tetrahydroindenyl)zirconium dichloride, ethylene-bis(tetrahydroindenyl)zirconium dichloride, or dimethylsilandiyl-bis(tetrahydroindenyl)zirconium dichloride, is used as a catalyst. The working examples only regard ethylene/propylene copolymers.

The homogeneity of the distribution of the α-olefin monomeric units in the copolymers obtained operating in the presence of these types of catalyst, although turning out improved with respect to the copolymers obtained from Ziegler-Natta catalysts, is still not totally satisfactory.

SUMMARY OF THE INVENTION

Hence, it would be extremely advantageous to obtain copolymers of ethylene with α-olefins different from propylene, and optionally with minor amounts of polyenes, in which the homogeneity of the distribution of the α-olefin monomeric units is sensibly improved.

It has been unexpectedly found that, by carrying out the polymerization reaction in the presence of particular metallocene catalysts, it is possible to prepare ethylene/α-olefin copolymers or ethylene/α-olefin/diene terpolymers in which the distribution of comonomers in the polymeric chain is extremely homogeneous.

It is therefore an object of the present invention a substantially amorphous copolymer of ethylene with one or more α-olefins of formula (I):

$$CH_2=CHR \qquad (I)$$

wherein R is an alkyl radical having from 2 to 10 carbon atoms, and optionally with one or more polyenes, having a content of ethylene derived units comprised between about 35% and 85% by mole, a content of α-olefin derived units comprised between about 10% and 60% by mole and a content of polyene derived units comprised between about 0 to 5% by mole, and having the following characteristics:

(A) the % by mole content of α-olefin in the copolymer (%α) and the ratio between the molar amount of α-olefin diads and the molar content of α-olefin in the copolymer (αα/α) satisfy the following relationship:

$$(\%\alpha) - 250(\alpha\alpha/\alpha) \geq 10$$

(B) less than 2% of the $CH_2$ groups in the polymeric chain are in sequences $(CH_2)_n$, wherein n is an even number.

Another object of the present invention is an elastomeric copolymer obtainable by subjecting the above said copolymer to a vulcanization process.

Still another object of the present invention is a shaped article obtained from an elastomeric copolymer according to the invention.

A further object of the present invention is a process for the preparation of the above said substantially amorphous copolymers of ethylene.

DETAILED DESCRIPTION OF THE INVENTION

The content by mole of ethylene derived units is preferably comprised between about 50% and 85% and more preferably between about 60% and 80%.

The molar content of α-olefin derived units is preferably comprised between about 15% and 50% and, more preferably, between about 20% and 40%.

The content of polyene derived units is preferably comprised between about 0 and 4% and, more preferably, between about 0 and 3%.

Non-limitative examples of α-olefins which can be used as comonomers in the copolymers according to the present invention are 1-butene, 1-hexene, 4-methyl-1-pentene, 1-octene and 1-decene.

The polyenes which can be used as comonomers in the copolymer of the invention are comprised in the following classes:

non-conjugated diolefins capable of cyclopolymerization such as, for example, 1,5-hexadiene, 1,6-heptadiene, 2-methyl-1,5-hexadiene;

dienes capable of giving unsaturated monomeric units, in particular conjugated dienes such as, for example, butadiene and isoprene, and linear non-conjugated dienes such as, for example, trans 1,4-hexadiene, cis 1,4-hexadiene, 6-methyl-1,5-heptadiene, 3,7-dimethyl-1,6-octadiene, 11-methyl-1,10-dodecadiene.

A particularly interesting embodiment of the present invention is constituted of substantially amorphous copolymers of ethylene with 1-butene.

The copolymers according to the present invention are substantially void of crystallinity. Their melting enthalpy ($\Delta H_f$) are lower than about 20 J/g and, preferably, lower than about 10 J/g. With the exception of the copolymers in which the amount of ethylene derived units is close to the upper limit of 85% molar, the copolymers according to the invention generally have a melting enthalpy of 0 J/g.

The copolymers according to the invention are characterised by an extremely homogenous distribution of the comonomers in the polymeric chain and, more precisely, by the fact of containing a number of sequences of two or more consecutive units of the α-olefin derived units which is extremely low, and anyway lower than in the copolymers known at the date of the present invention.

The analysis of the distribution of the α-olefin in the copolymers of the invention has been carried out using $^{13}$C-N.M.R. The assignments, in the case of ethylene/1-butene copolymers, were carried out as described by J. C. Randall in "Macromolecules (1982), 15, 353–360".

The spectra are divided in the following eight areas:
(A1) from 40.0 to 38.9 ppm,
(A2) 37.2 ppm,
(A3) from 34.8 to 34.16 ppm,
(A4) from 34.16 to 33.5 ppm,
(A5) from 31.0 to 29.0 ppm,
(A6) from 27.5 to 26.8 ppm,
(A7) from 26.8 to 26.5 ppm,
(A8) from 25.0 to 24.0 ppm.

The concentration (molar fraction) of the diads is obtained from the following equations:

$$EE=0.5[A5+0,5(A6-A2)]/Z$$

$$EB=0.5[A1+A3+A4+0,5(A6-A2)+A8]/Z$$

$$BB=0.5(A2/Z)$$

with Z=EE+EB+BB, wherein EE, EB and BB represent the sequences ethylene/ethylene, ethylene/1-butene and 1-butene/1-butene in the copolymer respectively.

The number of α-olefin sequences results to be dependent on the amount of α-olefin monomeric units present in the chain.

In particular, the % content by mole of α-olefins in the copolymer (%α) and the % content by mole of α-olefin diads (%αα) satisfies the following relationship:

$$(\%\alpha)-9\,(\%\alpha\alpha)\geq 10$$

preferably:

$$(\%\alpha)-10(\%\alpha\alpha)\geq 10$$

more preferably:

$$(\%\alpha)-11(\%\alpha\alpha)\geq 10$$

If the ratio between the amount by mole of α-olefin diads and the content by mole of α-olefins in the copolymer (αα/α) is considered, the copolymers of the invention satisfy the following relationship:

$$(\%\alpha)-250(\alpha\alpha/\alpha)\geq 10$$

preferably:

$$(\%\alpha)-300(\alpha\alpha/\alpha)\geq 10$$

more preferably:

$$(\%\alpha)-350(\alpha\alpha/\alpha)\geq 10$$

BRIEF DESCRIPTION OF DRAWINGS

The FIGS. 1 and 2 refer to ethylene/1-butene copolymers obtained with a process according to the present invention, in the presence of dimethylsilandiyl-bis(fluorenyl)zirconium dichloride ($Me_2SiFlu_2ZrCl_2$) and to ethylene/1-butene copolymers obtained in the presence of ethylene-bis(4,5,6,7-tetrahydroindenyl)zirconium dichloride ($EBTHIZrCl_2$). These figures show the content of 1-butene diads in the polymeric chain.

In particular, in FIG. 1 there are reported the % molar amounts of the 1-butene diads (%BB) as a function of the molar percentage of 1-butene contained as a copolymer (%B), whilst in FIG. 2 are reported the ratio (BB/B) in function of the molar content of 1-butene (%B). The amounts of 1-butene units being equal, the values of the 1-butene diads (%BB) and of the ratio (BB/B) for the copolymers of the invention are always higher than those for the other polymers, as a demonstration of the improved distribution of 1-butene units in the chain.

Figure 1:
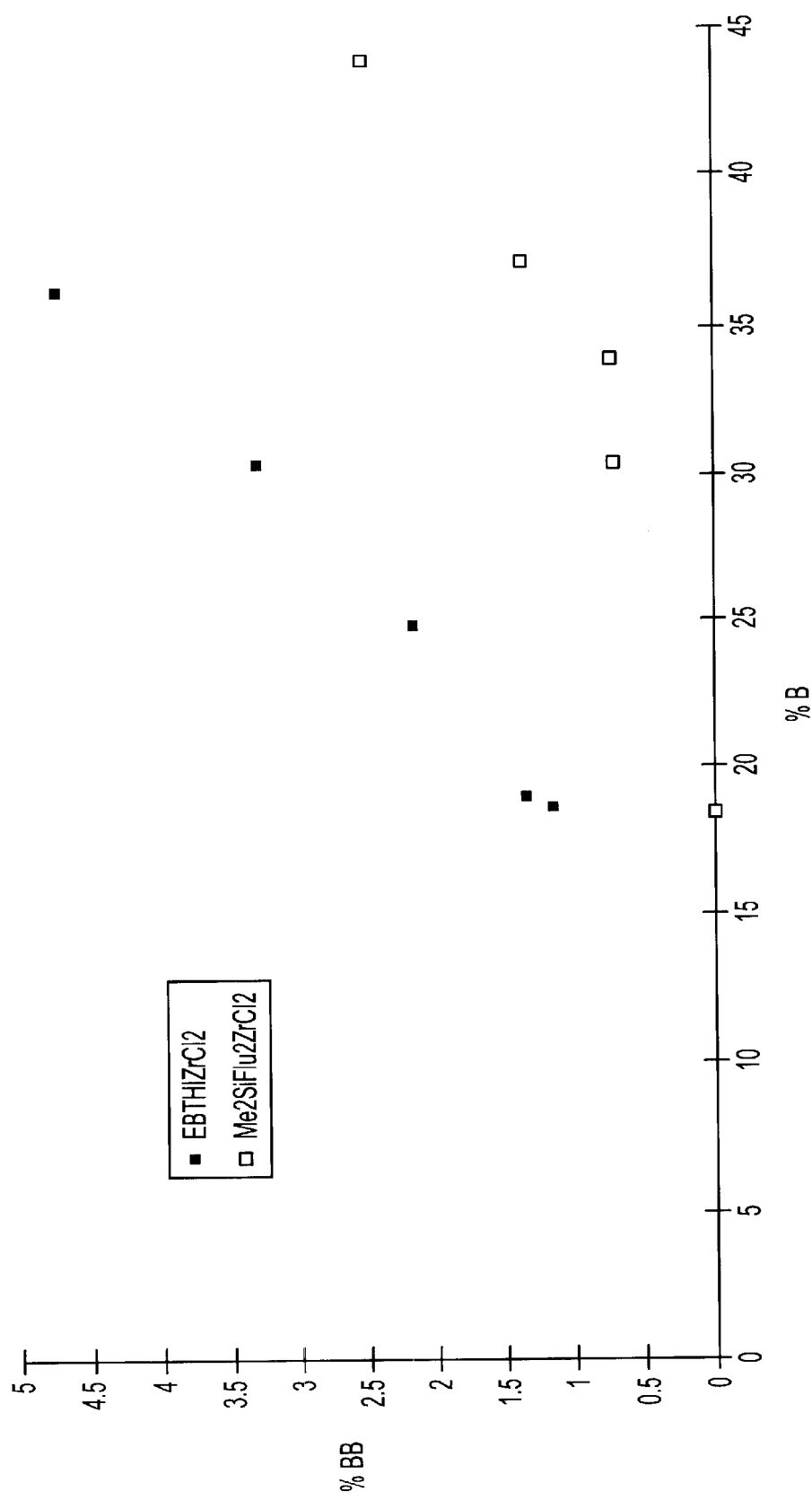

In the copolymers according to the present invention the product of the reactivity ratios $r_1r_2$, wherein $r_1$ is the reactivity ratio of the α-olefin and $r_2$ that of ethylene, calculated according to "Finemann H., Ross S. D., J. Pol. Sci. 1950, (2), 259", appears to be very low. Particularly, in the case of ethylene/1-butene copolymer, it is lower than 0.1, preferably lower than 0.08 and, more preferably, lower than 0.06.

The copolymer structure according to the invention is highly regioregular. In fact, from the $^{13}$C-N.M.R. analysis no signals are revealed as deriving from the $(CH_2)_n$ sequence where n is an even number. Preferably, less than 1% of the $CH_2$ groups in the chain are contained in a $(CH_2)_n$ sequence, where n is an even number.

The copolymers of the invention have intrinsic viscosity values (I.V.) generally higher than 1.0 dl/g and, preferably, higher than 1.5 dl/g. The intrinsic viscosity can reach values of 2.0 dl/g and higher.

Generally the polymers of the invention are endowed of a narrow molecular weight distribution. An indication of the molecular weight distribution is represented by the ratio $M_w/M_n$ which, for the copolymers of the invention, is generally lower than 4, preferably lower than 3.5 and, more preferably, lower than 3.

The copolymers of the invention are generally soluble in common solvents such as, for example, chloroform, hexane, heptane and toluene.

The copolymers of the invention may be vulcanized using the known techniques and methods for the EPR and EPDM rubbers, operating, for example, in the presence of peroxide or sulfur. Rubbers are obtained having valuable elastomeric The rubbers obtained from the copolymers of the invention are transformable in shaped articles by the normal thermoplastic material processing (molding, extrusion, injection, etc.) and the relative shaped articles are endowed with interesting elastomeric properties.

Moreover, the products of the present invention find uses in all applications typical of the elastomeric α-olefins, such as EPR and EPDM.

The copolymers of the invention can be prepared through a process, which constitutes another object of the present invention, which comprises the polymerization reaction of a mixture of ethylene and one or more α-olefins of formula (I):

$$CH_2{=}CHR \quad (I)$$

wherein R is an alkyl radical containing from 2 to 10 carbon atoms, and optionally of one or more polyenes, in the presence of a catalytic quantity of a catalyst comprising the product of the reaction between:

(A) a metallocene compound of formula (I):

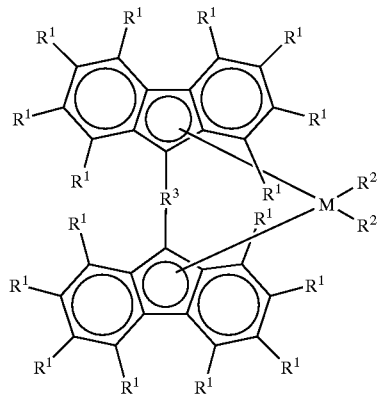

wherein substituents $R^1$, the same or different from each other, are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals, or $C_7$–$C_{20}$ arylalkyl radicals, optionally two adjacent substituents $R^1$ can form a cycle comprising from 5 to 8 carbon atoms and, furthermore, substituents $R^1$ can contain Si or Ge atoms;

M is Ti, Zr or Hf;

substituents $R^2$, the same or different from each other, are halogen atoms, —OH, —SH, $R^1$, —$OR^1$, —$SR^1$, —$NR^1_2$ or $PR^1_2$, wherein $R^1$ is defined as above;

the group $R^3$ is selected from $>CR^1_2$, $>SiR^1_2$, $>GeR^1_2$, $>NR^1$ or $>PR^1$, wherein $R^1$ is defined as above and optionally, when $R^3$ is $>CR^1_2$, $>SiR^1_2$ or $>GeR^1_2$, both substituents $R^1$ can form a cycle comprising from 3 to 8 atoms, optionally as reaction product with an aluminium organo-metallic compound of formula $AlR^4_3$ or $Al_2R^4_6$, wherein substituents $R^4$, the same or different from each other, are $R^1$ or halogen, and (B) an alumoxane, optionally mixed with an aluminium organo-metallic compound of formula $AlR^4_3$ or $Al_2R^4_6$, wherein substituents $R^4$, the same or different from each other, are defined as above, or one or more compounds able to give a metallocene alkyl cation.

The alumoxane used as component (B) can be obtained by reaction between water and an organometallic compound of aluminium of formula $AlR_3$ or $Al_2R^4_6$, wherein substituents $R^4$, the same or different from each other, are defined as above, with the provision that at least one $R^4$ is different from halogen. In that case, these are reacted in molar ratios Al/water comprised between about 1:1 and 100:1.

The molar ratio between aluminium and the metal of the metallocene is comprised between about 10:1 and about 5000:1, and preferably between 100:1 and 4000:1.

Metallocenes of formula (I) particularly suitable are those wherein M=Zr, substituents $R^1$ are hydrogen atoms, substituents $R^2$ are chlorine or methyl groups, and the group $R^3$ is a radical>$Si(CH_3)_2$ such as, for example, dimethylsilandiylbis(fluorenyl)zirconium dichloride.

The alumoxane used in the catalyst according to the invention is a linear, branched or cyclic compound, containing at least one group of the type:

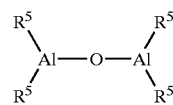

wherein substituents $R^5$, the same or different from each other, are $R^1$ or a group —O—$Al(R^5)_2$, and optionally some $R^5$ can be halogen or hydrogen atoms.

In particular, it is possible to use alumoxanes of formula:

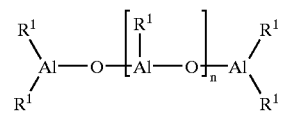

in the case of linear compounds, wherein n is 0 or an integer comprised between 1 and 40, or alumoxanes of formula:

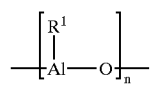

in the case of cyclic compounds, wherein n is an integer comprised between 2 and 40.

Radicals $R^1$ are preferably methyl, ethyl or isobutyl. Examples of alumoxanes suitable for the use according to the present invention are methylalumoxane (MAO) and isobutylalumoxane (TIBAO).

Nonlimiting examples of aluminium compounds of formula $AlR_3$ or $Al_2R^4_6$ are:
$Al(Me)_3$, $Al(Et)_3$, $AlH(Et)_2$, $Al(iBu)_3$,
$AlH(iBu)_2$, $Al(iHex)_3$, $Al(C_6H_5)_3$, $Al(CH_2C_6H_5)_3$,
$Al(CH_2CMe_3)_3$, $Al(CH_2SiMe_3)_3$, $Al(Me)_2iBu$, $Al(Me)_2Et$,
$AlMe(Et)_2$, $AlMe(iBu)_2$, $Al(Me)_2iBu$, $Al(Me)_2Cl$,
$Al(Et)_2Cl$, $AlEtCl_2$, $Al_2(Et)_3Cl_3$,
wherein Me=methyl, Et=ethyl, iBu=isobutyl, iHex=isohexyl.

Among the above mentioned aluminium compounds, trimethylaluminium and triisobutylaluminium are preferred.

Nonlimiting examples of compounds able to form a metallocene alkyl cation are compounds of formula $Y^+Z^-$, wherein $Y^+$ is a Bronsted acid, able to give a proton and to react irreversibly with a substituent $R^2$ of the metallocene of formula (I), and $Z^-$ is a compatible anion, which does not coordinate, which is able to stabilize the active catalytic species which originates from the reaction of the two compounds and which is sufficiently labile to be able to be removed from an olefinic substrate. Preferably, the anion $Z^-$ comprises one or more boron atoms. More preferably, the anion $Z^-$ is an anion of the formula $BAr^{(-)}_4$, wherein substituents Ar, the same or different from each other, are aryl radicals such as phenyl, pentafluorophenyl, bis (trifluoromethyl)phenyl. Particularly preferred is the tetrakis-pentafluorophenyl borate. Furthermore, compounds of formula $BAr_3$ can be suitably used.

The catalysts used in the process of the present invention can be also used on inert supports. This is obtained by depositing the metallocene (A), or the product of the reaction of the same with the component (B), or the component (B) and thereafter the metallocene (A), on inert supports such as for example silica, alumina, styrene-divinylbenzene copolymers or polyethylene.

The solid compound thus obtained, combined with a further addition of alkylaluminium compound either as such or prereacted with water, if necessary, is usefully used in the gas phase polymerization.

The process of copolymerization of ethylene in the presence of the above described catalysts can be carried out in liquid phase, in the presence or not of an inert aromatic hydrocarbon solvent, such as toluene, or in gas phase.

The polymerization temperature is generally comprised between 0° C. and 250° C., in particular between 20° C. and 150° C., and more particularly between 40° C. and 90° C.

The molecular weight of the copolymers can be varied merely by varying the polymerization temperature, the type or the concentration of the catalytic components or by using molecular ecular weight regulators such as, for example, hydrogen.

The molecular weight distribution can be changed using mixtures of different metallocenes, or carrying out the polymerization in more steps differing as to polymerization temperatures and/or concentrations of the molecular weight regulator.

Polymerization yields depend on the purity of the metallocene component of the catalyst. Therefore, metallocenes obtained from the process of the invention can be used either as such or subjected to purification treatments.

The components of the catalyst can be contacted among them before the polymerization. The contact time is generally comprised between 1 and 60 minutes, preferably between 5 and 20 minutes.

The following examples are given to illustrate and not limit the invention.

Characterizations

The content of 1-butene in the copolymer and the amount of isolated 1-butene units in the chain were determined by $^{13}C$-N.M.R analysis.

The $^{13}C$-N.M.R. analysis of the copolymer was carried out with a Bruker AC200 instrument, at a temperature of 120° C., on samples prepared by dissolving about 300 mg of polymer in 2.5 cc of a 3:1 mixture of trichlorobenzene/$C_2D_2Cl_4$. The spectra were registered with the following parameters:

Relaction delay=12 sec,

Number of scans=2000÷2500.

The Differential Scanning Calorimetry (DSC) measurements were carried out on an apparatus DSC-7 of Perkin-Elmer Co. Ltd. according to the following procedure. About 10 mg of sample were heated at 200° C. with a scanning speed equal to 10° C./minute. The sample was kept at 200° C. for 5 minutes and thereafter was cooled with a scanning speed equal to 10° C./minute. Thereafter a second scanning was carried out according to the same modalities of the first one. The values reported are those obtained in the first scanning.

The intrinsic viscosity [η] was measured in tetraline at 135° C.

The molecular weight distribution was determined by GPC carried out on a WATERS 150 instrument in orthodichlorobenzene at 135° C.

For physical-mechanical characterisation of the copolymers, mixtures were used obtained by calendering, having the following composition:

100 g of copolymer;
30 g of carbon black 550;
5 g of ZnO;
1 g of stearic acid;
1 g of Sartomer 206, commercial product of ANCOMER;
4.5 g of Peroximon F40, commercial product of ATOCHEM.

The mixtures so prepared were compression molded with a 35 ton press at a pressure of 200 $Kg/cm^2$, temperature of 165° C. and for a period of time of 30 min. Platelets of 200×120 ×2 mm were obtained from which samples were drawn for the determination of the tension set (200%) and of the stress-strain curve. The measurements were carried out at a traction speed of 500 mm/min.

Preparation of the Catalyst Components

Dimethylsilandiylbis(fluorenyl)zirconium dichloride (DMSBF)

(A) Synthesis of the Ligand

To a solution obtained by dissolving 50 g (0.30 mols) of fluorine in 400 ml of tetrahydrofuran (THF), maintained under stirring at a temperature of 0° C., 120 ml (0.30 mols) of a sol- ution of n-butyllithium 2.5 M in hexane were added dropwise. Once the addition was completed, the solution was brought to a room temperature and maintained under stirring for a further 5 hours until there was no further evolution of gas.

The solution so obtained, containing fluorine anions, was added dropwise to a solution obtained by dissolving 19.4 g (0.15 mols) of dimethyldichlorosilane in 100 ml of THF, maintaining under stirring at a temperature of 0° C. Once completed the addition, the solution was brought to room temperature and maintained under stirring for a further 17 hours.

The reaction was interrupted by the addition of 150 ml of water and the organic layer was dried under magnesium sulfate. Then, after removing the solvents, a vacuum was applied and the solids so collected were recrystallized from hexane.

37.8 g of dimethylbisfluorenylsilane of formula $(CH_3)_2Si(Flu)_2$, wherein Flu=fluorenyl, were obtained, the structure and chemical purity of which was confirmed by GC-MS and $^1H$-NMR.

(B) Metallocene Synthesis

To a solution prepared by dissolving 8.5 g (0.0219 mols) of the ligand $(CH_3)_2Si(Flu)_2$ obtained at point (A) in 75 ml of diethylether ($Et_2O$), maintained under stirring at a temperature of 0° C., 31.25 ml of a solution of methyllithium 1.4 M in $Et_2O$ were added dropwise. Once the addition was completed the suspension obtained was brought to room temperature and maintained tained under stirring for a further 5 hours until there was no further evolution of gas.

Then the suspension was subjected to filtration, obtaining a bright yellow powder which was washed with $Et_2O$ and pentane.

The ligand dianion so obtained was re-suspended in 100 ml of $Et_2O$ and then added dropwise to a suspension of 5.1 g (0.0219 mole) of $ZrCl_4$ in 150 ml of pentane maintained under rapid stirring at a temperature of −78° C.

Once the addition was completed the suspension obtained was brought to room temperature and maintained under stirring for a further 17 hours.

Then the suspension was dried and 13.56 g of product were obtained.

Ethylene-bis(tetrahydroindenyl)zirconium dichloride (EBTHI)

It was prepared according to the method described in "H. H. Brintzinger et al., J. Organomet. Chem., 288, p.63 (1985)".

Tetraisobutyldialuminoxane (TIBAO)

It was prepared according to Example 2 of EP-A-384171.

Polymerization

EXAMPLE 1

1.8 mmols of water, 700 ml of n-hexane and the amounts of 1-butene and ethylene reported in Table 1 were introduced into a 2.6 l steel autoclave, equipped with a stirrer, manometer, temperature indicator, means of loading the catalyst, feed lines for the monomers and a thermostating jacket purged with ethylene at 80° C. The autoclave was then brought to a temperature of 5° C. lower than the polymerization temperature.

The catalyst solution was prepared as follows. A solution of TIBAL in toluene (0.2 gr TIBAL/ml solution) was added to a solution of DMSBF in toluene (3 ml toluene/mg DMSBF). This was maintained under stirring at a temperature of 20° C. for 5 minutes, then the solution was injected into the autoclave under a pressure of an ethylene/1-butene mixture in a ratio such to maintain in solution the relative concentrations as reported above. The temperature was then rapidly brought to values required for polymerization.

The polymerization conditions are reported in Table 1.

The polymer obtained was isolated by removing non-reacted monomers, and then dried under vacuum.

The characterization data of the polymer obtained are reported in Table 2.

From the DSC analysis a melting point of 40.4° C. was revealed corresponding to a melting enthalpy ($\Delta H_f$) of 3.6 J/g.

In the $^{13}$C-N.M.R. spectra no peak revealing the presence of the —$(CH_2)_n$— sequence comprised between two tertiary carbon atoms, where n is an even number, was observed.

EXAMPLE 2

Operating according to the procedure described in Example 1, but in the absence of n-hexane, 3.5 mmols of water, and the amounts of 1-butene, ethylene, hydrogen and catalyst reported in Table 1 were introduced in the autoclave.

The polymerization conditions are reported in Table 1. The characterization data of the polymer obtained are reported in Table 2.

From the DSC analysis no melting point was revealed.

In the $^{13}$C-N.M.R. spectra no peak revealing the presence of the —$(CH_2)_n$— sequence comprised between two tertiary carbon atoms, where n is an even number, was observed.

EXAMPLES 3–5

Operating according to the procedure described in Example 2, but in the absence of water and using TIBAO instead of TIBAL, the amounts of 1-butene, ethylene, hydrogen and catalyst reported in Table 1 were introduced in the autoclave.

The polymerization conditions are reported in Table 1. The characterization data of the polymer obtained are reported in Table 2.

From the DSC analysis no melting point was revealed.

In the $^{13}$C-N.M.R. spectra no peak revealing the presence of the —$(CH_2)_n$— sequence comprised between two tertiary carbon atoms, where n is an even number, was observed.

From the copolymerization data of Examples 1 and 3–5, the following reactivity ratios have been calculated according to the Finemann-Ross method:

$r_1 = 0.00987$ $r_2 = 5.19$ $r_1 \cdot r_2 = 0.0512$

Comparative Examples 1–5

It was worked according to the procedure described in Example 1, but with the difference that a 4.25 l autoclave was used in which 2090 ml of n-hexane was introduced, and that EBTHI was used instead of DMSBF.

The polymerization conditions are reported in Table 1. The charaterization data of the polymer obtained are reported in Table 2.

TABLE 1

| Example | Zr (mmols · $10^{-3}$) | Al (mmols) | Al/$H_2O$ (mol.) | Al/Zr (mol.) | $C_2$ liq. phase (grams) | $C_2$ liq. phase (% weight) | $C_4$ liq. phase (grams) | $C_4$ liq. phase (% weight) | $H_2$ liq. phase (% weight) | P tot. (bar) | T (° C.) | Time period (min) | yield (g) | Activity (Kg$_{pol}$/g$_{ts}$/h) |
|---|---|---|---|---|---|---|---|---|---|---|---|---|---|---|
| 1 | 3.55 | 3.6 | 2 | 1013 | 37 | 5.57 | 100 | 16.33 | / | 9.0 | 30 | 60 | 68 | 209.8 |
| 2 | 6.97 | 6.97 | 2 | 1000 | 76.2 | 7.08 | 1000 | 92.9 | 0.017 | 13.1 | 50 | 120 | 67 | 52.7 |
| 3 | 9.45 | 9.61 | / | 1017 | 123 | 12.0 | 900 | 88.0 | 0.016 | 18.2 | 50 | 60 | 145 | 168.2 |
| 4 | 15.3 | 15.3 | / | 1017 | 76.2 | 7.08 | 1000 | 92.9 | 0.017 | 13.1 | 50 | 60 | 276 | 197.4 |
| 5 | 8.36 | 8.36 | / | 1000 | 13.35 | 3.23 | 400 | 96.7 | / | 8.7 | 50 | 60 | 75 | 98.3 |
| COMP. 1 | 1.875 | 1.875 | 2 | 1000 | 30 | 1.86 | 435 | 24 | / | 5.9 | 50 | 60 | 17 | 99.4 |
| COMP. 2 | 1.88 | 1.88 | 2 | 1000 | 37 | 1.7 | 630 | 31.7 | / | 4.5 | 50 | 60 | 42 | 245.6 |
| COMP. 3 | 3.75 | 3.75 | 2 | 1000 | 30 | 1.52 | 630 | 31.8 | / | 4.6 | 50 | 60 | 35 | 102.3 |
| COMP. 4 | 7.5 | 7.5 | 2 | 1000 | 20.1 | 1.00 | 630 | 32 | / | 4.2 | 50 | 60 | 97 | 141.0 |
| COMP. 5 | 7.5 | 7.5 | 2 | 1000 | 13.5 | 0.7 | 630 | 32.1 | / | 3.4 | 50 | 60 | 209 | 305.5 |

TABLE 2

| Example | 1-butene (% mols) | N.M.R. EE (% mols) | N.M.R. EB (% mols) | N.M.R. BB (% mols) | BB/B | I.V. (dl/g) | $M_w/M_n$ | density (g/cc) | Tension set 200% (%) | breaking load (Mpa) | extensibility (%) |
|---|---|---|---|---|---|---|---|---|---|---|---|
| 1 | 18.4 | 63.4 | 36.6 | 0 | 0 | 2.74 | n.d. | n.d. | n.d. | n.d. | n.d. |
| 2 | 33.9 | 32.9 | 66.2 | $8.03 \cdot 10^{-1}$ | $2.37 \cdot 10^{-2}$ | 1.61 | n.d. | 0.8652 | n.d. | n.d. | n.d. |
| 3 | 30.4 | 40.0 | 59.2 | $7.63 \cdot 10^{-1}$ | $2.51 \cdot 10^{-2}$ | 1.84 | n.d. | 0.8642 | 3 | 12.2 | 350 |
| 4 | 37.1 | 27.3 | 71.2 | 1.45 | $3.92 \cdot 10^{-2}$ | 1.54 | 2.4 | 0.8634 | 2 | n.d. | n.d. |
| 5 | 43.8 | 15.1 | 82.2 | 2.66 | $6.08 \cdot 10^{-2}$ | 1.45 | n.d. | n.d. | n.d. | n.d. | n.d. |
| COMP. 1 | 18.6 | 64.0 | 34.8 | 1.18 | $6.33 \cdot 10^{-2}$ | 3.15 | n.d. | n.d. | n.d. | n.d. | n.d. |
| COMP. 2 | 19.0 | 63.4 | 35.2 | 1.37 | $7.23 \cdot 10^{-2}$ | 4.17 | n.d. | n.d. | n.d. | n.d. | n.d. |
| COMP. 3 | 24.8 | 52.7 | 45.1 | 2.22 | $8.96 \cdot 10^{-2}$ | 2.07 | 2.1 | n.d. | n.d. | n.d. | n.d. |
| COMP. 4 | 30.2 | 43.0 | 53.6 | 3.37 | $1.11 \cdot 10^{-1}$ | 1.53 | 2.0 | n.d. | 4 | 12.1 | 465 |
| COMP. 5 | 36.0 | 32.9 | 62.3 | 4.84 | $1.34 \cdot 10^{-1}$ | 1.16 | 2.3 | n.d. | 5 | 9.4 | 440 | n.d. = not determined

What is claimed is:

1. A process for the preparation of a copolymer, comprising the polymerization reaction of mixtures of ethylene, one or more α-olefins of formula (I):

$$CH_2=CHR \qquad (I)$$

where R is an alkyl radical containing from 2 to 10 carbon atoms and optionally one or more polyenes, in the presence of a catalytic amount of a catalyst comprising the product of the reaction between:

(A) a compound of formula (II)

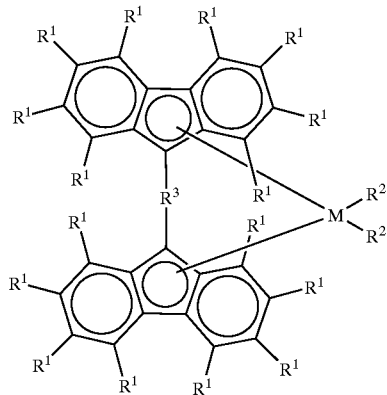

wherein substituents $R^1$, the same or different from each other, are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals, or $C_7$–$C_{20}$ arylalkyl radicals, optionally two adjacent substituents $R^1$ can form a cycle comprising from 5 to 8 carbon atoms and, furthermore, substituents $R^1$ can contain Si or Ge atoms;
M is Ti, Zr or Hf;
substituents $R^2$, the same or different from each other, are halogen atoms, —OH, —SH, $R^1$, —$OR^1$, —$SR^1$, —$NR^1_2$ or —$PR^1_2$, wherein $R^1$ is defined as above;
the group $R^3$ is selected from $>CR^1_2$, $>SiR^1_2$, $>GeR^1_2$, $>NR^1$ or $>PR^1$, wherein $R^1$ is defined as above and optionally, when $R^3$ is $>CR^1_2$, $>SiR^1_2$ or $>GeR^1_2$, both substituents $R^1$ can form a cycle comprising from 3 to 8 atoms, optionally as a reaction product with an aluminium organo-metallic compound of formula $AlR^4_3$ or $Al_2R^4_6$, wherein substituents $R^4$, the same or different from each other, are $R^1$ or halogen, and (B) an alumoxane, optionally mixed with aluminium organo-metallic compound of formula $AlR^4_3$ or $Al_2R^4_6$, wherein substituents $R^4$, the same or different from each other, are defined as above, or one or more compounds able to give a metallocene alkyl cation, said copolymer having a content of ethylene derived units comprised between about 35% and 85% by mole, a content of α-olefin derived units comprised between about 10% and 60% by mole, and having the following characteristics:

(1) the percent molar amount of α-olefin in the copolymer (%α) and the ratio between the molar amount of α-olefin diads and the molar content of α-olefin in the copolymer (αα/α) satisfy the following relationship;

(%α)−250(αα/α)≧10

(2) less than 2% of the $CH_2$ groups in the polymeric chain are in sequences $(CH_2)_n$, wherein n is an even number.

2. A process for the preparation of a copolymer according to claim 1, in which the catalyst comprises the product of the reaction between:

A) dimethylsilandiylbis(fluorenyl) zirconium dichloride, and

B) a compound selected from the group consisting of tetraisobutyl-dialumoxane (TIBAO) and the reaction product between triisobutyl aluminium (TIBAL) and water.

* * * * *